(12) United States Patent
Jacobson et al.

(10) Patent No.: US 10,440,894 B2
(45) Date of Patent: Oct. 15, 2019

(54) WRAP DEVICE FOR A ROUND MODULE BUILDER

(71) Applicant: Deere & Company, Moline, IL (US)

(72) Inventors: Marcus A Jacobson, Ankeny, IA (US);
Scott D Weber, Bondurant, IA (US);
Jeffrey S Wigdahl, Ames, IA (US);
Roy Withers, Murtaugh, ID (US)

(73) Assignee: Deere & Company, Moline, IL (US)

( * ) Notice: Subject to any disclaimer, the term of this patent is extended or adjusted under 35 U.S.C. 154(b) by 939 days.

(21) Appl. No.: 13/966,417

(22) Filed: Aug. 14, 2013

(65) Prior Publication Data

US 2015/0047311 A1 Feb. 19, 2015

(51) Int. Cl.
*A01F 15/07* (2006.01)

(52) U.S. Cl.
CPC ......... *A01F 15/0715* (2013.01); *Y02P 60/142* (2015.11)

(58) Field of Classification Search
CPC .......................... A01F 15/071; A01F 15/0715
See application file for complete search history.

(56) References Cited

U.S. PATENT DOCUMENTS

| 645,805 A | 3/1900 | Graham | |
|---|---|---|---|
| 4,333,301 A * | 6/1982 | Koutonen | B65B 45/00 100/15 |
| 4,779,526 A * | 10/1988 | Frerich | A01F 15/0715 100/5 |
| 4,956,968 A * | 9/1990 | Underhill | A01F 15/0715 100/88 |
| 4,969,315 A * | 11/1990 | Ardueser | A01F 15/0715 53/389.2 |
| 5,129,207 A * | 7/1992 | Butler | A01F 15/0715 53/118 |

(Continued)

FOREIGN PATENT DOCUMENTS

| CN | 101422107 A | 5/2009 |
|---|---|---|
| CN | 202979706 U | 6/2013 |

(Continued)

OTHER PUBLICATIONS https://www.youtube.com/watch?v=JyD1c_a-all: MrFullen, 7760 JOhn Deere-Animacao Do Conceito, Apr. 4, 2011, YouTube.*

(Continued)

*Primary Examiner* — Nathaniel C Chukwurah
*Assistant Examiner* — Lucas E. A. Palmer (57) ABSTRACT

A wrap device for communicating a wrap to a bale chamber of a round module builder. The round module builder comprises a bale sheave for driving a bale belt to wrap a round module with the wrap. The wrap device comprises a wrap floor. A wrap floor linkage couples the wrap floor to the round module builder. A first sheave and a second sheave are coupled to the wrap floor. A wrap floor belt is supported by the first and second sheaves. An actuator is coupled to at least one of the wrap floor linkage and the wrap floor to move the wrap floor from a disengaged position to an engaged position. In the disengaged position, the wrap is not communicated to the bale chamber. In the engaged position, the wrap floor belt engages the bale belt and communicates the wrap to the bale chamber.

20 Claims, 6 Drawing Sheets

(56) References Cited

U.S. PATENT DOCUMENTS

| | | | |
|---|---|---|---|
| 5,129,208 A * | 7/1992 | Van Zee | A01F 15/0715 53/118 |
| 5,152,123 A * | 10/1992 | Viaud | A01F 15/0715 100/4 |
| 5,349,806 A * | 9/1994 | Swearingen | A01F 15/0715 100/5 |
| 5,519,988 A | 5/1996 | Copley et al. | |
| 5,557,906 A * | 9/1996 | Viaud | A01F 15/0715 53/118 |
| 5,687,548 A | 11/1997 | McClure et al. | |
| 5,727,359 A * | 3/1998 | Rampp | A01F 15/071 53/211 |
| 5,729,953 A * | 3/1998 | Fell | A01F 15/0715 53/118 |
| 5,979,141 A * | 11/1999 | Phillips | A01F 15/0715 242/337 |
| 6,006,504 A * | 12/1999 | Myers | A01F 15/0715 53/556 |
| 6,032,446 A * | 3/2000 | Gola | A01F 15/00 100/151 |
| 6,050,052 A * | 4/2000 | Herron | A01F 15/0715 53/118 |
| 6,421,992 B1 | 7/2002 | Goering et al. | |
| 6,421,996 B1 * | 7/2002 | Deutsch | A01D 46/084 100/88 |
| 6,453,805 B1 * | 9/2002 | Viaud | A01F 15/0715 100/13 |
| 6,591,743 B2 | 7/2003 | Deutsch et al. | |
| 6,941,740 B2 | 9/2005 | Fox et al. | |
| 6,966,162 B2 * | 11/2005 | Viaud | A01F 15/0715 100/4 |
| 7,694,491 B2 | 4/2010 | Noonan et al. | |
| 8,069,638 B2 | 12/2011 | Wigdahl et al. | |
| 8,087,216 B2 | 1/2012 | Noonan et al. | |
| 2001/0003236 A1 * | 6/2001 | Viaud | A01F 15/07 53/589 |
| 2001/0013214 A1 * | 8/2001 | Viaud | A01F 15/0705 53/116 |
| 2001/0047640 A1 * | 12/2001 | Schaefer | A01F 15/071 53/399 |
| 2004/0089167 A1 * | 5/2004 | Viaud | A01F 15/071 100/88 |
| 2004/0250702 A1 * | 12/2004 | McHale | A01F 15/071 100/87 |
| 2007/0081878 A1 * | 4/2007 | McHale | A01F 15/071 414/24.5 |
| 2007/0240389 A1 * | 10/2007 | Frerichs | A01F 15/0715 53/587 |
| 2008/0282662 A1 * | 11/2008 | Viaud | A01F 15/0715 56/341 |
| 2009/0107349 A1 * | 4/2009 | Noonan | A01F 15/071 100/14 |
| 2009/0240389 A1 | 9/2009 | Nomura et al. | |
| 2009/0249746 A1 * | 10/2009 | Viaud | A01F 15/071 53/399 |
| 2010/0024357 A1 * | 2/2010 | Viaud | A01F 15/071 53/116 |
| 2010/0192516 A1 * | 8/2010 | Olander | A01F 15/0715 53/399 |
| 2012/0042792 A1 * | 2/2012 | Smith | A01F 15/0715 100/2 |
| 2012/0060444 A1 * | 3/2012 | Reijersen Van Buuren | A01F 15/071 53/203 |
| 2012/0073455 A1 * | 3/2012 | Vandamme | A01F 15/0715 100/35 |
| 2012/0090273 A1 * | 4/2012 | Reijersen Van Buuren | A01F 15/071 53/461 |
| 2012/0090274 A1 * | 4/2012 | Reijersen Van Buuren | A01F 15/071 53/461 |
| 2012/0204735 A1 * | 8/2012 | Claeys | A01F 15/0715 100/5 |
| 2012/0210886 A1 * | 8/2012 | Reijersen Van Buuren | A01F 15/071 100/7 |
| 2012/0233963 A1 * | 9/2012 | Chapon | A01F 15/071 53/203 |
| 2012/0240517 A1 * | 9/2012 | Chapon | A01F 15/071 53/203 |
| 2012/0240527 A1 * | 9/2012 | Herron | A01F 15/0715 53/461 |
| 2012/0266763 A1 * | 10/2012 | Foster | A01F 15/0715 100/2 |
| 2012/0311961 A1 * | 12/2012 | Reijersen Van Buuren | A01F 15/071 53/218 |
| 2012/0318152 A1 * | 12/2012 | Nes | A01F 15/071 100/3 |
| 2013/0104754 A1 * | 5/2013 | Van Amstel | A01F 15/0715 100/3 |
| 2014/0260090 A1 * | 9/2014 | Smith | B65B 27/125 53/397 |

FOREIGN PATENT DOCUMENTS

| | | | | |
|---|---|---|---|---|
| EP | 1205102 A2 * | 5/2002 | | A01F 15/071 |
| WO | WO 03039240 A1 * | 5/2003 | | A01F 15/071 |
| WO | WO 2005009112 A2 * | 2/2005 | | A01F 15/0715 |
| WO | 2012027504 A2 | 3/2012 | | |
| WO | WO 2012057612 A2 * | 5/2012 | | A01F 15/0715 |

OTHER PUBLICATIONS

John Deere 7760 Cotton Picker [online] 2013, [retrieved Jun. 20, 2013] Retrieved from the Internet: <URL: http://www.deere.com/wps/dcom/en_US/products/equipment/cotton_harvesting/7760_cotton_picker/7760_cotton_picker.page?.

Images showing wrap device for round module builder. (1 page)(Admitted as prior art before Aug. 14, 2013).

Chinese Office Action and a brief translation of foreign office action (CN) for counterpart application No. 201410396458.3, dated Jul. 7, 2017. (17 pages).

Australian Examination Report No. 1 for counterpart application No. 2014210576, dated Apr. 7, 2017. (3 pages).

Chinese Office Action and a brief translation of foreign office action (CN) for counterpart application No. 201410396458.3, dated Mar. 29, 2018. (18 pages).

* cited by examiner

WRAP DEVICE FOR A ROUND MODULE BUILDER

FIELD OF THE DISCLOSURE

The present disclosure generally relates to round module builders, and more particularly to a wrap device for round module builders.

BACKGROUND OF THE DISCLOSURE

In order to harvest a crop and provide a compact bale or round module, harvesters commonly include a harvesting structure, as shown and described in commonly assigned U.S. Pat. No. 5,519,988, and a bale/round module forming structure or other crop processing structure, as shown and described in commonly assigned U.S. Pat. No. 7,694,491. Once the bale/round module is formed, the bale/round module is wrapped with twine or plastic to maintain the bale/round module in a compacted state, as shown and described in commonly assigned U.S. Pat. No. 8,087,216.

SUMMARY OF THE DISCLOSURE

In one embodiment, a wrap device for communicating a wrap to a bale chamber of a round module builder is disclosed. The round module builder comprises at least one bale sheave for driving at least one bale belt to wrap a round module with the wrap. The wrap device comprises a wrap floor comprising a first portion and a second portion opposite the first portion. A wrap floor linkage couples the wrap floor to the round module builder. A first sheave is coupled to the first portion of the wrap floor. A second sheave is coupled to the second portion of the wrap floor. At least one wrap floor belt is supported by the first sheave and the second sheave. An actuator is coupled to at least one of the wrap floor linkage and the wrap floor to move the wrap floor from a disengaged position to an engaged position. In the disengaged position, the wrap is not communicated to the bale chamber of the round module builder. In the engaged position, the wrap floor belt engages the bale belt and communicates the wrap to the bale chamber of the round module builder.

In another embodiment, a round module builder for forming a round module and wrapping the round module with a wrap is disclosed. The round module builder defines a bale chamber. At least one bale belt is positioned adjacent the bale chamber and configured to rotate the round module in the bale chamber. At least one bale sheave is configured to drive the bale belt. A wrap device is configured for communicating the wrap to the bale chamber. The wrap device comprises a wrap floor comprising a first portion and a second portion opposite the first portion. A wrap floor linkage couples the wrap floor to the round module builder. A first sheave is coupled to the first portion of the wrap floor. A second sheave is coupled to the second portion of the wrap floor. At least one wrap floor belt is supported by the first sheave and the second sheave. An actuator is coupled to at least one of the wrap floor linkage and the wrap floor to move the wrap floor from a disengaged position to an engaged position. In the disengaged position, the wrap is not communicated to the bale chamber. In the engaged position, the wrap floor belt engages the bale belt and communicates the wrap to the bale chamber.

In yet another embodiment a harvester for harvesting a crop, forming a round module, and wrapping the round module with a wrap is disclosed. The harvester comprises a harvesting structure configured for harvesting the crop. A round module builder defines a bale chamber and is configured to receive the crop. At least one bale belt is positioned adjacent the bale chamber and configured to rotate the round module in the bale chamber. At least one bale sheave is configured to drive the bale belt. A wrap device is provided for communicating the wrap to the bale chamber. The wrap device comprises a wrap floor. The wrap floor comprises a first portion and a second portion opposite the first portion. A wrap floor linkage couples the wrap floor to the round module builder. A first sheave is coupled to a first sheave linkage that is coupled to the first portion of the wrap floor. The first sheave linkage is yieldably biased towards the bale sheave. A second sheave is coupled to the second portion of the wrap floor. A third sheave is coupled to a second sheave linkage that is coupled to the second portion of the wrap floor. The second sheave linkage is yieldably biased towards the round module builder and configured to yield for positioning the wrap onto at least one wrap floor belt. The wrap floor belt is supported by the first sheave, the second sheave, and the third sheave. An actuator is coupled to at least one of the wrap floor linkage and the wrap floor to move the wrap floor from a disengaged position to an engaged position. In the disengaged position, the wrap is not communicated to the bale chamber. In an engaged position, the wrap floor belt engages the bale belt and communicates the wrap to the bale chamber.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
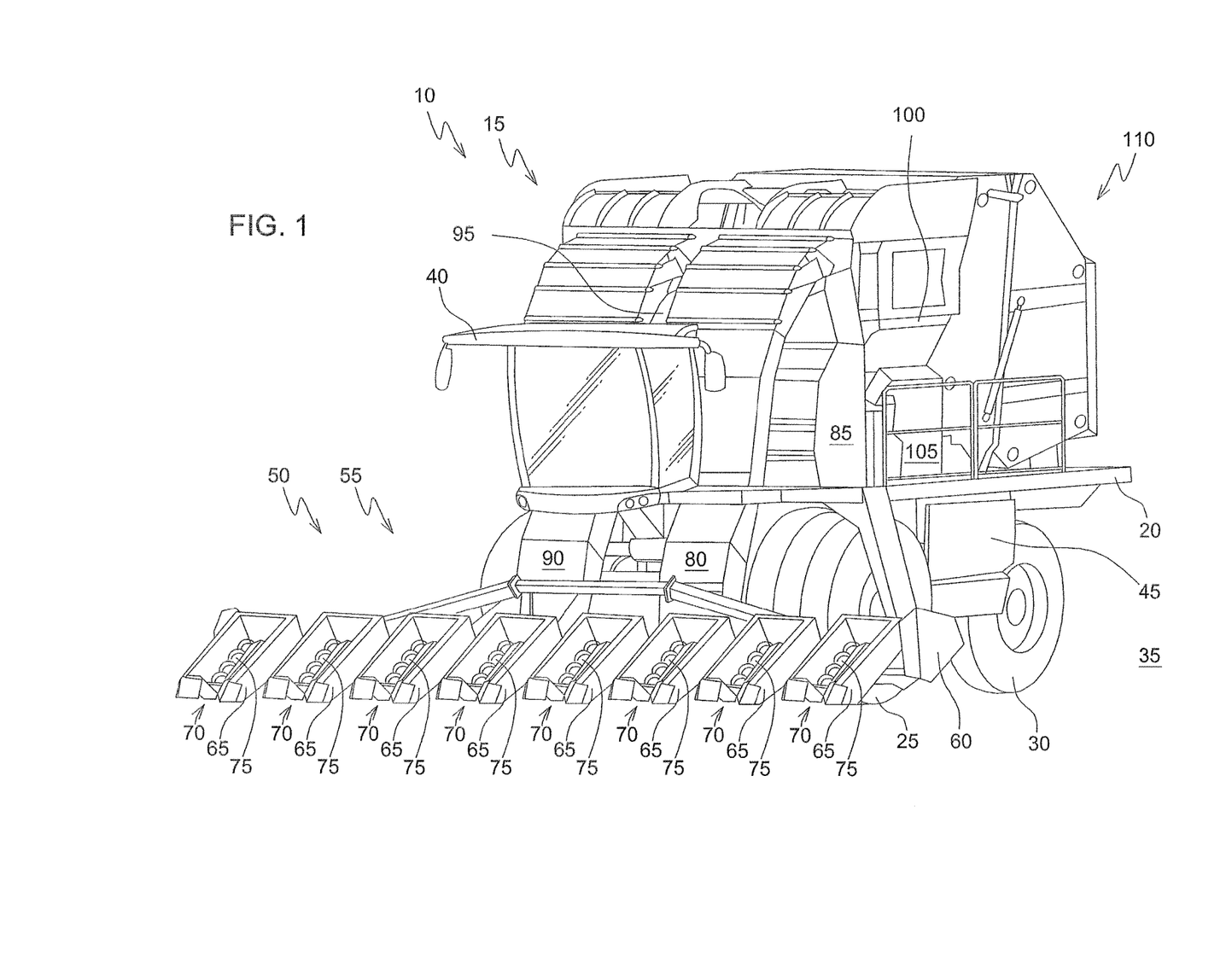
FIG. 1 is a perspective view of a harvester including a round module builder according to one embodiment.

FIG. 1 illustrates a harvester 10 according to one embodiment. The illustrated harvester 10 is a cotton stripper 15.

The harvester 10 includes a chassis 20. The chassis 20 is supported by front wheels 25 and rear wheels 30. The harvester 10 is adapted for movement through a field 35 to harvest crops (e.g., cotton, stover, hay, and alfalfa). An operator station 40 is supported by the chassis 20. A power module 45 may be supported below the chassis 20. The chassis 20 is generally similar to that shown and described in commonly assigned U.S. Pat. No. 7,631,716, the entire contents of which are hereby incorporated by reference.

A harvesting structure 50 is coupleable to the chassis 20. The illustrated harvesting structure 50 is a cotton stripper header 55. Other harvesting structures 50 are contemplated by this disclosure (e.g., cotton picker unit). The cotton stripper header 55 includes an auger housing 60 that is adjustably supported for vertical movement relative to the field 35. The cotton stripper header 55 is configured to remove cotton from the field 35. The cotton stripper header 55 includes a plurality of stripper row units 65. Each stripper row unit 65 includes a row-receiving area 70 with conventional counter-rotating brush structure driven by hydraulic pressure for removing cotton plant material including cotton burrs and cotton fibers from cotton plants. The removed material is conveyed rearwardly by stripper row unit augers 75 in the stripper row units 65.

A first duct 80 is coupleable to the harvesting structure 50 and configured to receive cotton therefrom. A first cleaner 85 is in communication with the first duct 80. The first cleaner 85 is configured to receive cotton from the first duct 80 and remove debris from the cotton as shown and described in commonly assigned U.S. Pat. No. 5,806,290, the entire contents of which are hereby incorporated by reference.

A second duct 90 is coupleable to the harvesting structure 50 and configured to receive cotton therefrom. A second cleaner 95 is in communication with the second duct 90. The second cleaner 95 is configured to receive cotton from the second duct 90 and remove debris from the cotton. Alternatively, one duct and one cleaner may be used.

An accumulator 100 is in communication with the first cleaner 85 and the second cleaner 95. The accumulator 100 is configured to receive cleaned cotton from the first cleaner 85 and the second cleaner 95.

A feeder 105 is coupleable to the chassis 20. The feeder 105 is configured to receive cotton from the accumulator 100. The feeder 105 is configured to compress the cotton via a plurality of rollers and transfer the cotton to a round module builder 110.

Figure 2:
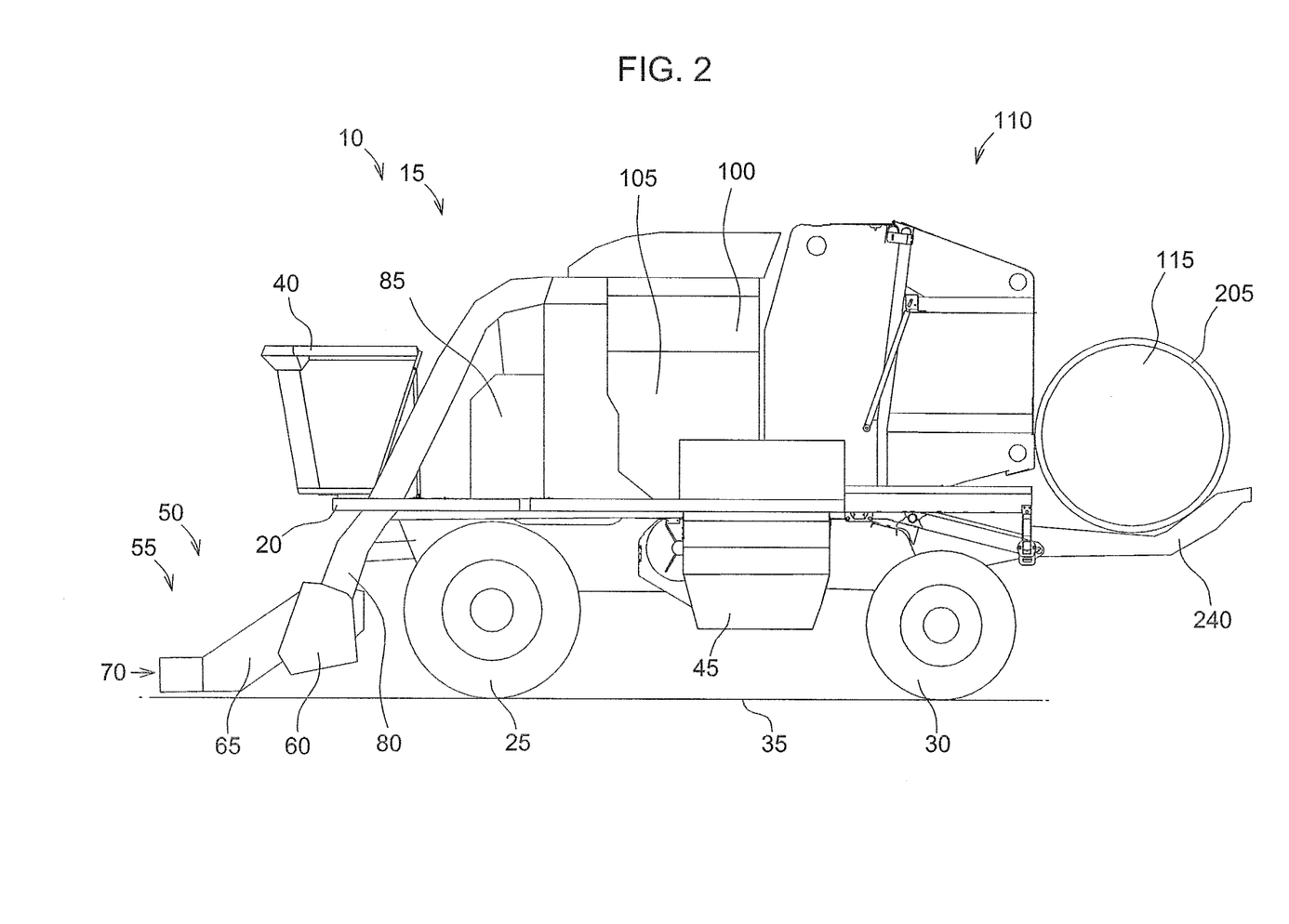
FIG. 2 is a side view of the harvester of FIG. 1.

With reference to FIG. 2, the round module builder 110 is configured to receive cotton and form a round module 115. The round module builder 110 defines a bale chamber 120 (FIG. 3).

Figure 3:
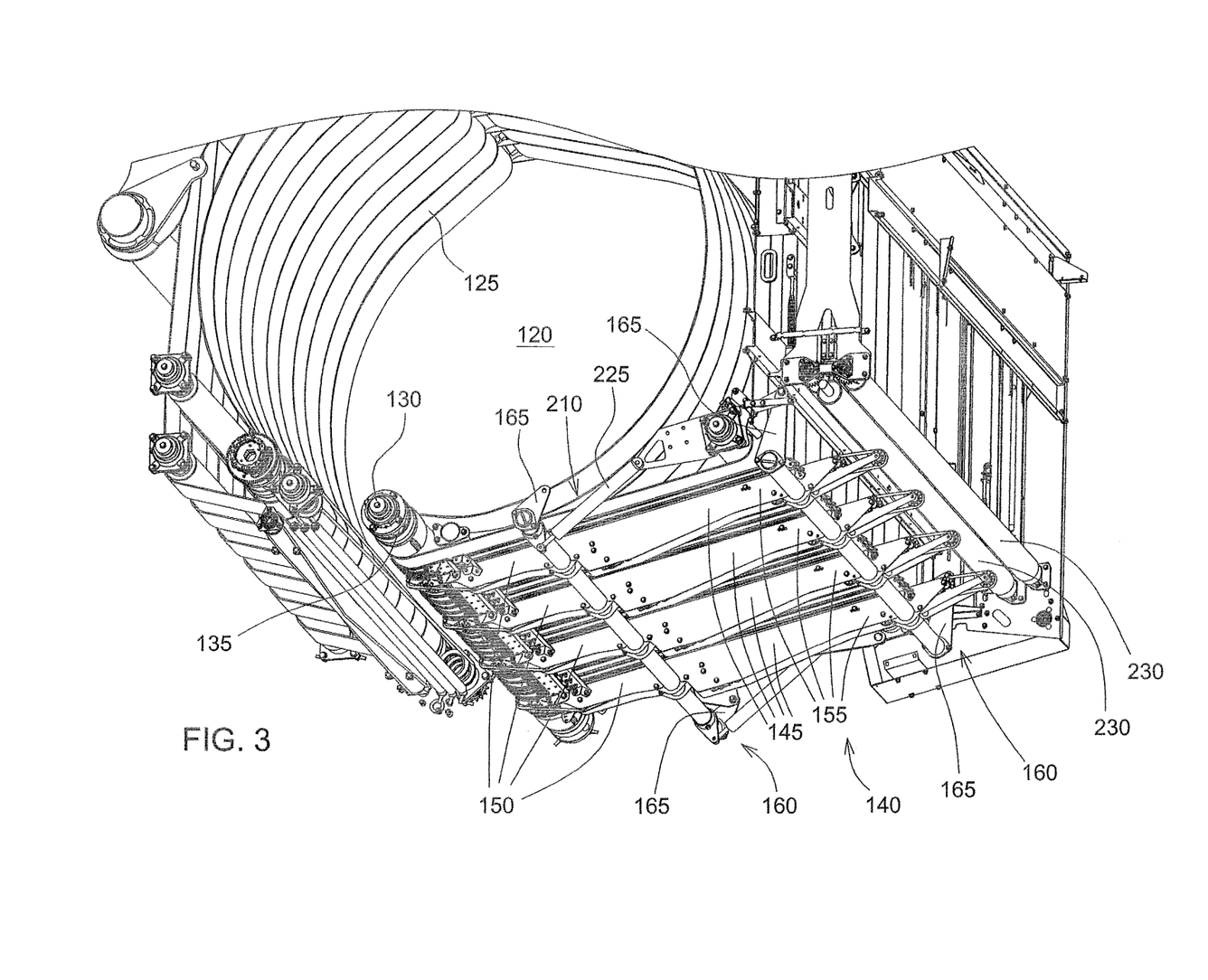
FIG. 3 is a partial perspective view of the round module builder of FIG. 1.

Referring to FIG. 3, a bale belt 125 is positioned adjacent the bale chamber 120. The bale belt 125 is configured to rotate the round module 115 (FIG. 2) in the bale chamber 120.

A bale sheave 130, comprising an outer surface 135, supports the bale belt 125. The bale sheave 130 is configured to drive the bale belt 125.

A wrap device 140 comprises a wrap floor 145. The wrap floor 145 comprises a first portion 150 and a second portion 155, opposite the first portion 150.

A wrap floor linkage 160 couples the wrap floor 145 to the round module builder 110. The illustrated wrap floor linkage 160 is a four-bar linkage 165.

Figure 4:
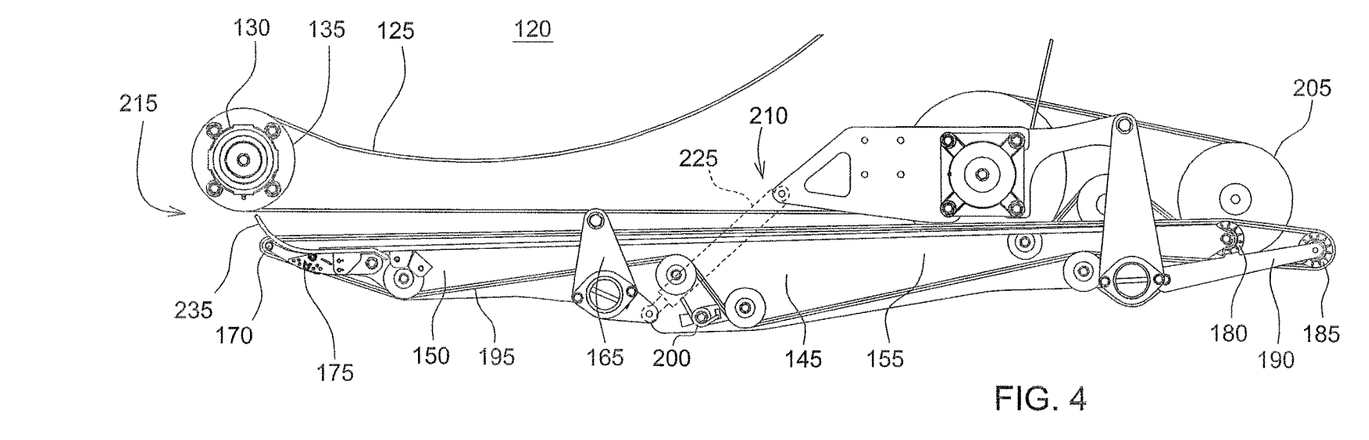
FIG. 4 is a partial side view of the round module builder of FIG. 1 showing a wrap floor in a disengaged position.
Figure 5:
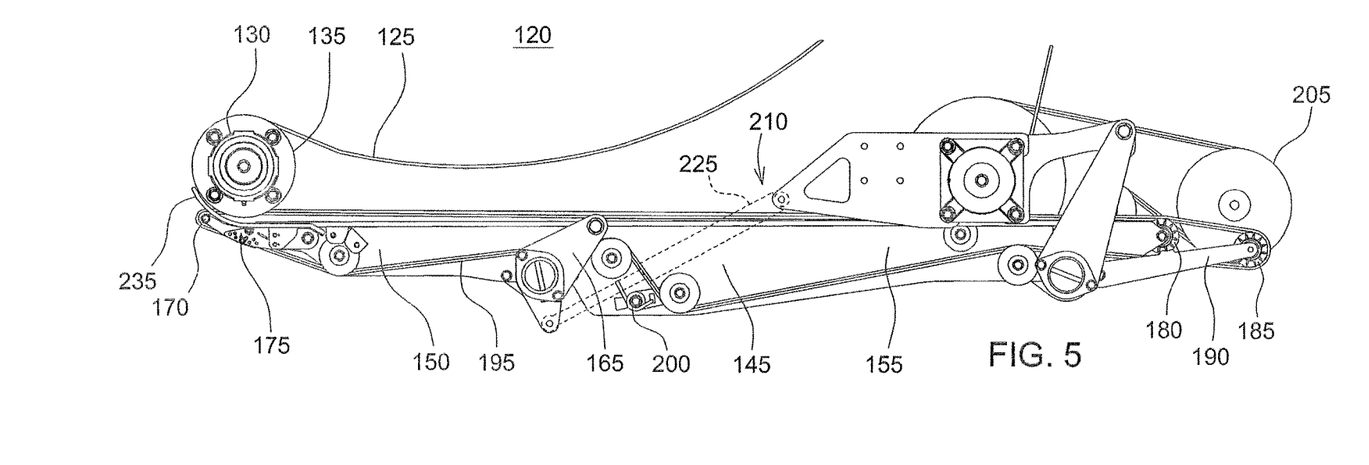
FIG. 5 is a partial side view of the round module builder of FIG. 1 showing the wrap floor in an engaged position.

With reference to FIGS. 4 and 5, a first sheave 170 is coupled to a first sheave linkage 175. The first sheave linkage 175 is coupled to the first portion 150 of the wrap floor 145. The first sheave linkage 175 is yieldably biased towards the bale sheave 130 by a spring or other structure.

A second sheave 180 is coupled to the second portion 155 of the wrap floor 145. A third sheave 185 is coupled to a second sheave linkage 190. The second sheave linkage 190 is coupled to the second portion 155 of the wrap floor 145.

The second sheave linkage 190 is yieldably biased towards the round module builder 110 by a spring or other structure.

A wrap floor belt 195 is supported by the first sheave 170, the second sheave 180, and the third sheave 185. The wrap floor linkage 160 is configured to maintain the wrap floor belt 195 in a substantially parallel relationship with the bale belt 125. Substantially parallel is plus or minus fifteen degrees.

A tensioner 200 is coupled to the wrap floor 145. The tensioner 200 is configured to tension the wrap floor belt 195.

Figure 6:
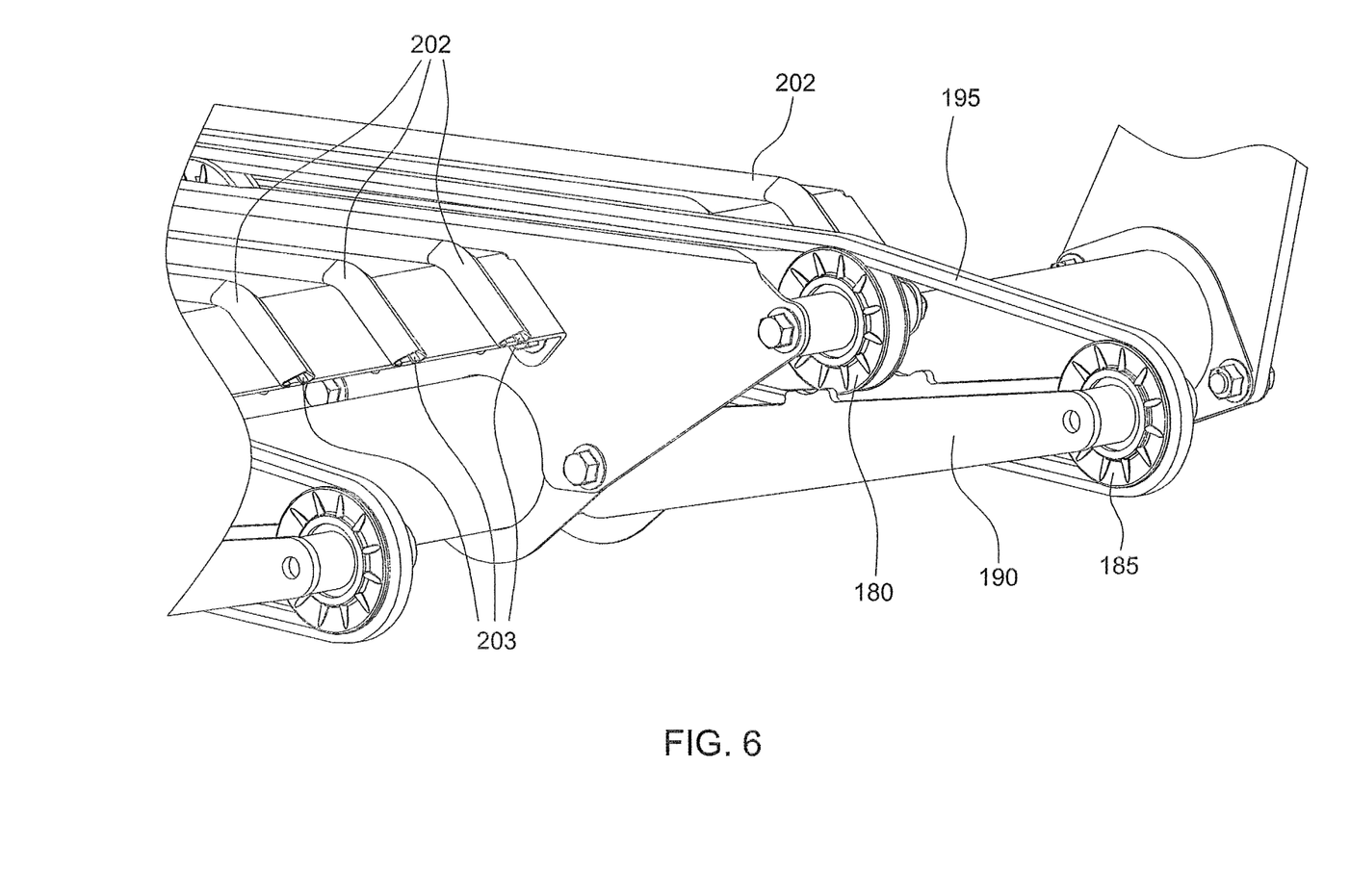
FIG. 6 is a partial rear view of the round module builder of FIG. 1.
Figure 7:
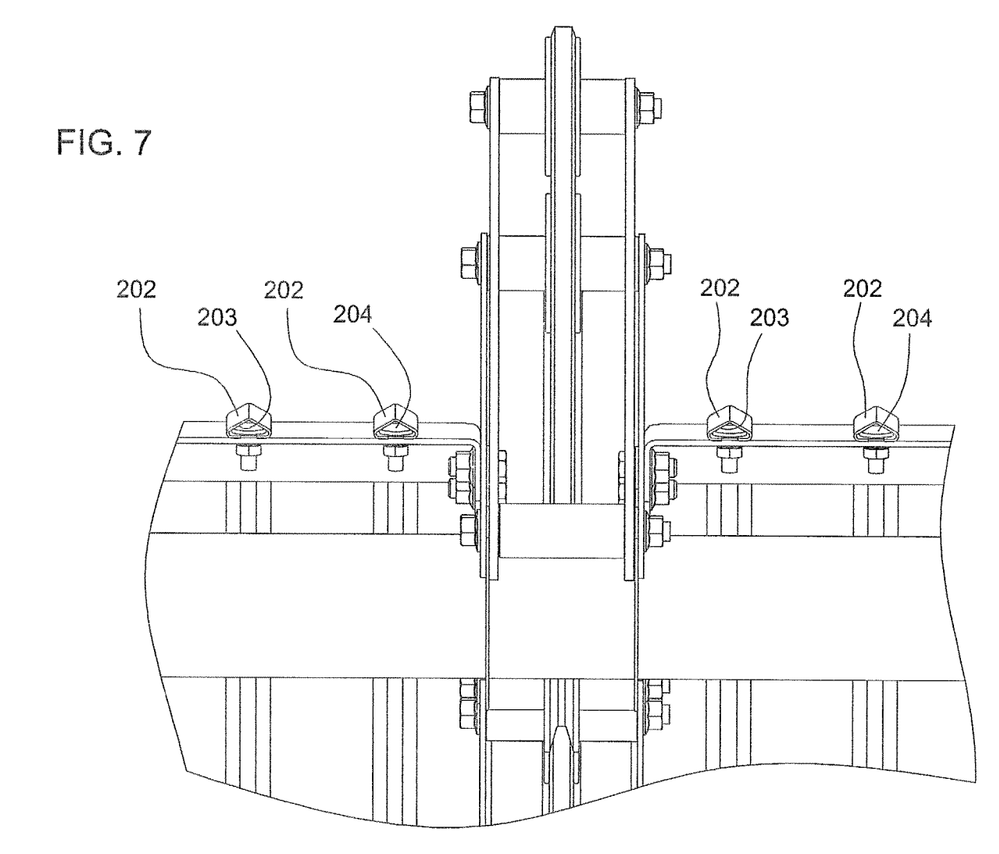
FIG. 7 is a zoomed in partial rear view of the round module builder of FIG. 1.

Referring to FIGS. 6 and 7, a wrap floor guide 202 is coupled to the wrap floor 145. The wrap floor guide 202 comprises a channel 203. The channel 203 is configured to non-rotatably secure a fastener 204. The fastener 204 secures the wrap floor guide 202 to the wrap floor 145.

With reference to FIGS. 2 and 3, upon completion of forming the round module 115, the round module 115 is tightly wrapped with a wrap (e.g., polyethylene plastic film) 205 to maintain the round module 115 in a compacted state. The wrap 120 is fed into the bale chamber 120 of the round module builder 110 by the wrap device 140.

With continued reference to FIG. 3, an actuator 210 is coupled to at least one of the wrap floor linkage 160 and the wrap floor 145 to move the wrap floor 145 of the wrap device 140 from a stored, disengaged position 215 (FIG. 4), where the wrap 205 is not communicated to the bale chamber 120, to an engaged position 220 (FIG. 5), where the wrap floor belt 195 engages the bale belt 125 and communicates the wrap 205 to the bale chamber 120. The illustrated actuator 210 is a hydraulic cylinder 225. Other actuators 210 are contemplated by this disclosure.

At least one wrap feed roller 230 communicates the wrap 205 to the wrap floor belt 195 at a wrap feed roller rate, which is less than a bale belt rate. This stretches the wrap 205 and provides a tightly-wrapped round module 115.

With reference to FIGS. 4 and 5, a guide rod 235 is coupled to the first portion 150 of the wrap floor 145. The guide rod 235 is yieldably biased, by a spring or other structure, towards the bale sheave 130 to guide the wrap 205 to the bale chamber 120. The guide rod 235 is contoured to engage the outer surface 135 of the bale sheave 130.

With continued reference to FIG. 2, a module handling system 240 is positioned adjacent the round module builder 110 for receiving the round module 115. The module handling system 240 temporarily supports the round module 115 and then discharges it from the cotton harvester 10.

In operation, the harvester 10 is driven through the field 35 to harvest crops. The harvesting structure 50 removes crops from plants in the field 35. Crops are transferred by the first duct 80 and the second duct 90 to the first cleaner 85 and the second cleaner 95 where debris is removed. Alternatively, only one duct and one cleaner may be used. The crop is then transferred to the accumulator 100. The accumulator 100 holds the crop until a predetermined crop level is reached and then transfers the crop to the feeder 105. In an exemplary embodiment, the accumulator 100 transfers crop to the feeder 105 four times for each round module 115 produced. When the feeder 105 receives crop, the plurality of rollers is activated to compress the crop. The compressed crop is transferred to the round module builder 110.

After the round module builder 110 receives compressed crop, the compressed crop is rotated to form the round module 115. When the round module 115 reaches a preset target size, the bale belt 125 is activated at the bale belt rate.

The actuator 210 raises the wrap floor 145 via the wrap floor linkage 160 to the engaged position 220. The first sheave linkage 175 is configured to position the wrap floor belt 195 into engagement with the bale belt 125 adjacent the outer surface 135 of the bale sheave 130. The wrap floor belt 195 raises the wrap 205 to contact the bale belt 125, thereby creating a pinch point. The guide rod 235 helps guide the wrap 205 to the bale chamber 120. The yieldable bias of the guide rod 235 compensates for asymmetrical round module 115 formations and improves the approach angle of the wrap 205 for deeper penetration of the wrap 205 into the bale chamber 120. The wrap floor guide 202 supports the wrap 205 on the wrap floor 145.

The wrap feed roller 230 is activated at the wrap feed roller rate, which is a slower speed than the bale belt rate. This stretches the wrap 205 to tightly wrap the round module 115. Friction between the wrap floor belt 195 and the bale belt 125 pulls the wrap 205 into the bale chamber 120 of the round module builder 110.

Once the wrap 205 has been fed into the bale chamber 120, the wrap floor 145 is lowered to the disengaged position 215. Wrap 205 continues to be pulled into the bale chamber 120 by friction between the round module 115 and the bale belt 125.

Once wrap separation is initiated, a wrap brake is engaged which stops rotation of the wrap feed roller 230 and separates the wrap 205. This separation exposes adhesive on the wrap 205 which is pressed against the round module 115 to secure the wrap 205. The next wrap 205 is staged on the wrap floor belt 195 for the next round module 115.

Once the round module 115 has been wrapped, the round module 115 can be ejected onto the module handling system 240. The module handling system 240 supports the round module, 115 and then discharges it from the harvester 10.

Once the wrap 205 supply is empty, additional wrap 205 can be loaded into the wrap device 140. Wrap 205 is loaded by biasing the second sheave linkage 190 away from the round module builder 110 to position the wrap 205 onto the wrap floor belt 195.

Advantageously, the placement of the wrap 205 in the bale chamber 120 and on the round module 115 is improved (not bunched or folded over) while reducing the overall weight, cost, and complexity of the wrap device 140. The weight reduction reduces soil compaction, improves fuel economy, and reduces stress on the chassis 20.

Various features are set forth in the following claims.

What is claimed is:

1. A wrap device for communicating a wrap to a bale chamber of a round module builder, the round module builder comprising a bale sheave driving a bale belt to wrap a round module with the wrap, the wrap device comprising:
a wrap floor comprising a first portion and a second portion opposite the first portion;
a wrap floor linkage coupling the wrap floor to the round module builder;
a first sheave coupled to the first portion of the wrap floor;
a second sheave coupled to the second portion of the wrap floor;
a wrap floor belt supported by the first sheave and the second sheave; and
an actuator coupled to at least one of the wrap floor linkage and the wrap floor to move the wrap floor and the first sheave relative to the bale sheave from a disengaged position, where the wrap is not communicated to the bale chamber, and the top of the first sheave is under the bottom of the bale sheave, to an engaged position, where the wrap floor belt engages the bale belt and communicates the wrap to the bale chamber, and the top of the first sheave is higher than the bottom of the bale sheave.

2. The wrap device of claim 1, wherein the first sheave is coupled to a first sheave linkage that is coupled to the first portion of the wrap floor, the first sheave linkage is yieldably biased towards the bale sheave and configured to position the wrap floor belt into engagement with the bale belt adjacent an outer surface of the bale sheave.

3. The wrap device of claim 1, further comprising a third sheave coupled to a second sheave linkage that is coupled to the second portion of the wrap floor, the third sheave supporting the wrap floor belt, the second sheave linkage is yieldably biased towards the round module builder and configured to yield for positioning the wrap onto the wrap floor belt.

4. The wrap device of claim 1, further comprising a tensioner coupled to the wrap floor, the tensioner configured to tension the wrap floor belt.

5. The wrap device of claim 1, wherein the wrap floor linkage is a four-bar linkage configured to maintain the wrap floor belt in a substantially parallel relationship with the bale belt.

6. The wrap device of claim 1, wherein the actuator is a hydraulic cylinder, and the hydraulic cylinder extends to move the wrap floor and the first sheave from the disengaged position to the engaged position.

7. The wrap device of claim 1, further comprising a wrap feed roller configured to communicate wrap to the wrap floor belt at a wrap feed roller rate, which is less than a bale belt rate, thereby stretching the wrap and providing a tightly-wrapped round module.

8. The wrap device of claim 1, further comprising a wrap floor guide coupled to the wrap floor, the wrap floor guide configured to support the wrap on the wrap floor.

9. The wrap device of claim 8, wherein the wrap floor guide comprises a channel configured to non-rotatably secure a fastener, the fastener securing the wrap floor guide to the wrap floor.

10. The wrap device of claim 1, further comprising a guide rod coupled to the first portion of the wrap floor, the guide rod is yieldably biased towards the bale sheave to guide the wrap to the bale chamber.

11. The wrap device of claim 10, wherein the guide rod is contoured to engage an outer surface of the bale sheave.

12. A round module builder for forming a round module and wrapping the round module with a wrap, the round module builder defining a bale chamber, the round module builder comprising:
a bale belt positioned adjacent the bale chamber and configured to rotate the round module in the bale chamber;
a bale sheave supporting the bale belt, the bale sheave configured to drive the bale belt; and
a wrap device configured for communicating the wrap to the bale chamber, the wrap device comprising a wrap floor comprising a first portion and a second portion opposite the first portion, a wrap floor linkage coupling the wrap floor to the round module builder, a first sheave coupled to the first portion of the wrap floor, a second sheave coupled to the second portion of the wrap floor, a wrap floor belt supported by the first sheave and the second sheave, and an actuator coupled to at least one of the wrap floor linkage and the wrap floor to move the wrap floor and the first sheave relative to the bale sheave from a disengaged position, where the wrap is not communicated to the bale chamber, and the axis of the first sheave is rearward of the axis of the bale sheave, to an engaged position, where the wrap floor belt engages the bale belt and communicates the wrap to the bale chamber, and the axis of the first sheave is forward of the axis of the bale sheave.

13. The round module builder of claim 12, wherein the first sheave is coupled to a first sheave linkage that is coupled to the first portion of the wrap floor, the first sheave linkage is yieldably biased towards the bale sheave.

14. The round module builder of claim 12, further comprising a third sheave coupled to a second sheave linkage that is coupled to the second portion of the wrap floor, the second sheave linkage is yieldably biased towards the round module builder and configured to yield for positioning the wrap onto the wrap floor belt.

15. The round module builder of claim 12, further comprising a tensioner coupled to the wrap floor, the tensioner configured to tension the wrap floor belt.

16. The round module builder of claim 12, wherein the wrap floor linkage is a four-bar linkage configured to maintain the wrap floor belt in a substantially parallel relationship with the bale belt.

17. The round module builder of claim 12, further comprising a wrap feed roller configured to rotate and communicate wrap to the wrap floor belt at a wrap feed roller rate, which is less than a bale belt rate, thereby stretching the wrap and providing a tightly-wrapped round module.

18. The round module builder of claim 12, further comprising a wrap floor guide coupled to the wrap floor, the wrap floor guide configured to support the wrap on the wrap floor.

19. The round module builder of claim 12, further comprising a guide rod coupled to the first portion of the wrap floor, the guide rod is yieldably biased towards the bale sheave to guide the wrap to the bale chamber.

20. A harvester for harvesting a crop, forming a round module, and wrapping the round module with a wrap, the harvester comprising:

a harvesting structure configured for harvesting the crop; and a round module builder defining a bale chamber and configured to receive the crop, the round module builder comprising a bale belt positioned adjacent the bale chamber and configured to rotate the round module in the bale chamber, a bale sheave configured to drive the bale belt, and a wrap device for communicating the wrap to the bale chamber, the wrap device comprising a wrap floor comprising a first portion and a second portion opposite the first portion, a wrap floor linkage coupling the wrap floor to the round module builder, a first sheave coupled to a first sheave linkage that is coupled to the first portion of the wrap floor, the first sheave linkage is yieldably biased towards the bale sheave, a second sheave coupled to the second portion of the wrap floor, a third sheave coupled to a second sheave linkage that is coupled to the second portion of the wrap floor, the second sheave linkage is yieldably biased towards the round module builder and configured to yield for positioning the wrap onto the wrap floor belt, a wrap floor belt supported by the first sheave, the second sheave, and the third sheave, and an actuator coupled to at least one of the wrap floor linkage and the wrap floor to move the wrap floor and the first sheave relative to the bale sheave from a disengaged position, where the wrap is not communicated to the bale chamber, the top of the first sheave is under the bottom of the bale sheave, and the axis of the first sheave is rearward of the axis of the bale sheave, to an engaged position, where the wrap floor belt engages the bale belt and communicates the wrap to the bale chamber, the top of the first sheave is higher than the bottom of the bale sheave, and the axis of the first sheave is forward of the axis of the bale sheave.

* * * * *